United States Patent [19]

Stetson

[11] Patent Number: 4,731,347

[45] Date of Patent: Mar. 15, 1988

[54] GLASS FRIT COMPOSITION

[75] Inventor: Alvin R. Stetson, San Diego, Calif.

[73] Assignee: Solar Turbines Incorporated, San Diego, Calif.

[21] Appl. No.: 855,211

[22] Filed: Mar. 21, 1986

[51] Int. Cl.$^4$ .................. C03C 8/02; C03C 3/108; C03C 3/089

[52] U.S. Cl. ........................ 501/21; 501/61; 501/65

[58] Field of Search ................. 501/21, 61, 65

[56] References Cited

U.S. PATENT DOCUMENTS

| | | | |
|---|---|---|---|
| 1,693,130 | 11/1928 | Anderson | 428/433 |
| 2,662,020 | 12/1953 | Schofield et al. | 428/433 |
| 2,753,271 | 7/1956 | Treptow | 501/20 |
| 2,925,351 | 2/1960 | Judd | 428/433 |
| 4,361,654 | 11/1982 | Ohmura et al. | 501/21 |

FOREIGN PATENT DOCUMENTS 0108345  6/1985  Japan .................... 501/21

Primary Examiner—John F. Terapane
Assistant Examiner—Virginia B. Caress
Attorney, Agent, or Firm—Robert E. Muir; Joseph W. Keen

[57] ABSTRACT

A glass frit comprising about 60% by weight of glass formers, 30% by weight of monovalent fluxes and 10% by weight of divalent fluxes; the glass formers consisting essentially of $SiO_2$ and $B_2O_3$; the monovalent fluxes consisting essentially of $Li_2O$, $Na_2O$ and $K_2O$; the divalent fluxes being selected from the group consisting of CaO, SrO, BaO and PbO; and trace elements not exceeding 10% by weight. Preferably the glass frit has the following composition, in terms of oxides:

| | |
|---|---|
| $SiO_2$ | 49% |
| $B_2O_3$ | 12% |
| $Li_2O$ | 3.6% |
| $Na_2O$ | 14.4% |
| $K_2O$ | 11.4% |
| CaO | 5% |
| SrO | 1.85% |
| BaO | 2.75% |

The glass frit has a coefficient of thermal expansion of $7.2 \times 10^{-6}/°$ F. ($13 \times 10^{-6}/°$ C.) over the range from room temperature to 600° F. (316° C.). It is useable to make a slip where it can be fired at temperatures around 950° F. (510° C.) and applied to a suitable substrate in accordance with existing practices to provide a high quality coating or a viscous damper. Suitable substrates include many nickel-base alloys and stainless steels.

8 Claims, 2 Drawing Figures

GLASS FRIT COMPOSITION

TECHNICAL FIELD

The present invention relates generally to ceramic compositions and more particularly to a glass frit composition, i.e. in a powdered or comminuted form.

BACKGROUND ART

It is known that to obtain a glass frit having low firing temperatures, the alkali oxide content must be high. U.S. Pat. No. 2,925,351, issued Feb. 16, 1960 to D. M. Judd, discloses a glass frit having an alkali oxide content from 21% to 35% of the total composition; however, the composition therein disclosed was for application to aluminum and its alloys. The thermal expansion of typical aluminum alloys range from $12.8 \times 10^{-6}$ to $13.3 \times 10^{-6}/°F$. (i.e. $23 \times 10^{-6}$ to $24 \times 10^{-6}/°C$.). It is desirable to provide a glass frit composition having a coefficient of thermal expansion suitable for matching nickel-base alloys with varying amounts of molybdenum, chromium, manganese, copper, silicon and iron (e.g. Hastelloy X); for example in the range of $7.1 \times 10^{-6}$ to $7.9 \times 10^{-6}/°F$. (i.e. $12.8 \times 10^{-6}$ to $14.2 \times 10^{-6}/°C$.).

In the prior art, glass has been used for viscous damping at temperatures of 700° F. (about 370° C.) and higher. Somewhat below 700° F. (about 370° C.) organic materials have been used for damping, rubber being one example. It is desirable to provide a glass frit composition which would be useable for a damping material at temperatures below 700° F. (about 370° C.) or in a range intermediate existing damping materials.

The present invention is directed to meeting one or more of the objectives set forth above.

DISCLOSURE OF THE INVENTION

In accordance with one aspect of the present invention, there is provided a glass frit comprising about 60% by weight of glass formers, 30% by weight of monovalent fluxes and 10% by weight of divalent fluxes. The glass formers consist essentially of $SiO_2$ and $B_2O_3$; and the monovalent fluxes consist essentially of $Li_2O$, $Na_2O$ and $K_2O$. The divalent fluxes are selected from the group consisting of CaO, SrO, BaO and PbO; but preferably CaO, SrO and BaO. Additional elements may be present not exceeding 10% by weight.

BEST MODE FOR CARRYING OUT THE INVENTION

Figure 1:
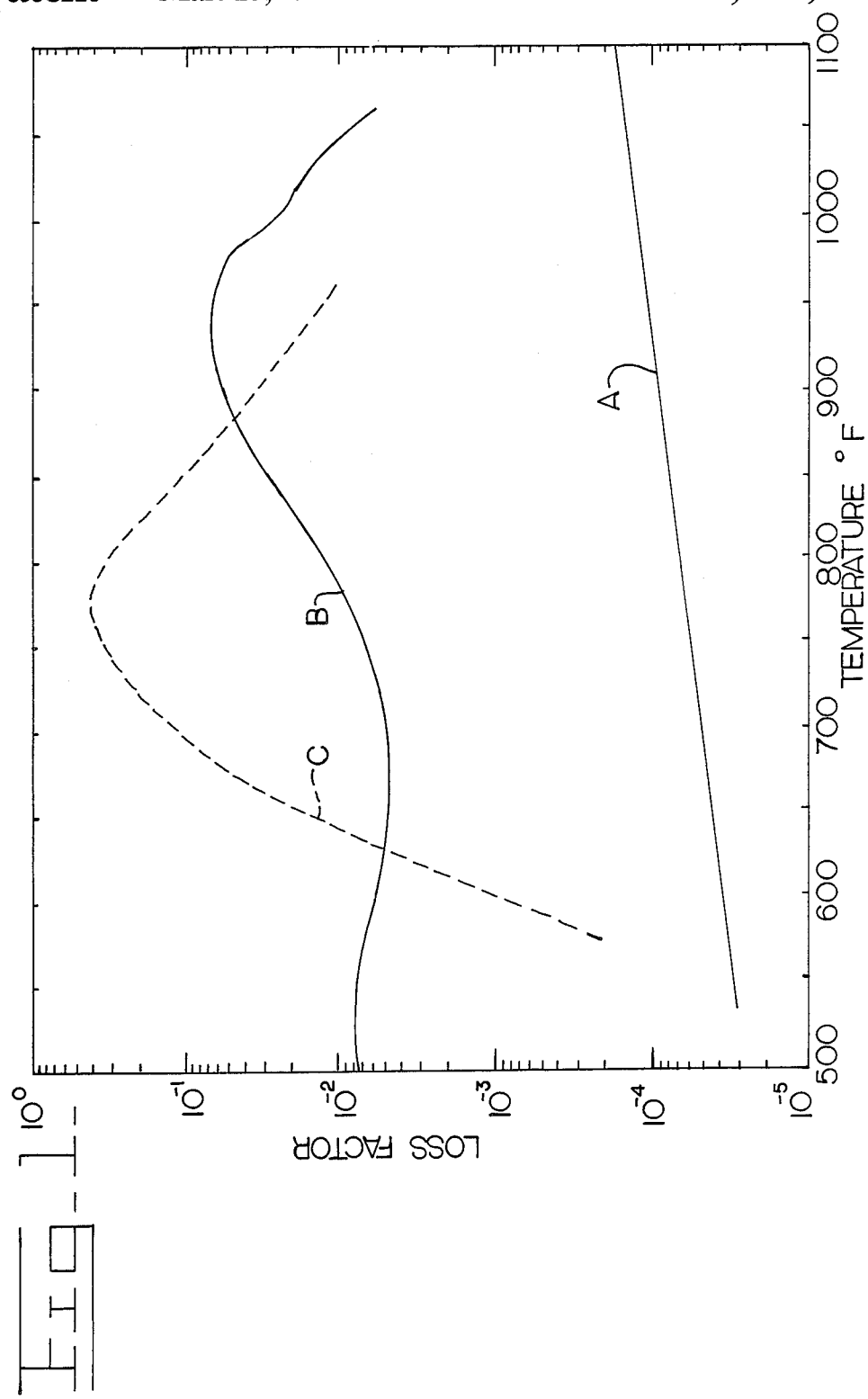
FIG. 1 is a graph plotting temperature vs. loss factor to show low temperature damping characteristics of a glass coating made from a glass frit composition made in accordance with the present invention.

A glass frit consists essentially of the following constituents calculated as weight percentages:

|  | Percent |
| --- | --- |
| $RO_2$ and $R_2O_3$ | 60 |
| $R_2O_1$ | 30 |
| $R_1O_1$ | 10 | where $RO_2$ represents the oxide of Si; $R_2O_3$ represents the oxide of B; $R_2O_1$ represents the oxides of Li, Na and K; and $R_1O_1$ represents the oxides of alkaline earth elements and lead.

It has been found that a low melting glass frit having a coefficient of expansion suitable for application to nickel-base alloys and alloys with similar coefficients of thermal expansion, can be made if certain basic concepts are followed. One example of such an alloy is precipitation-hardening (PH) stainless steel 15-5PH, 17-4PH. First, the alkali oxide content must be high in order to make the composition relatively more fluid. As shown above, this is about 30% and may range from 27% to 33% of the total composition. Second, the $B_2O_3$ should be in the range of 10% to 14% of the total composition. For low melting complexity of the formula is desirable; hence alkaline earth oxides are included. A CaO content in the range of 4% to 6% of the total composition is believed to be essential to minimize the overall movement of the alkali ions. The divalent Ca ion has been shown to be an effective element in blocking the movement of the monovalent and very mobile alkali ions, Na and K.

The formula of a preferred embodiment of a glass frit composition, in weight percentages, is as follows:

|  | Percent |
| --- | --- |
| $SiO_2$ | 49 |
| $B_2O_3$ | 12 |
| $Li_2O$ | 3.6 |
| $Na_2O$ | 14.4 |
| $K_2O$ | 11.4 |
| CaO | 5 |
| SrO | 1.85 |
| BaO | 2.75 |

This provides a coefficient of thermal expansion of $7.2 \times 10^{-6}/°F$. ($3.9 \times 10^{-6}/°C$.) over the range from room temperature to 600° F. (316° C.).

Note that the molecular equivalent ratios in the preferred composition are as follows:

| $Li_2O$ | 1 |
| --- | --- |
| $Na_2O$ | 1.9 |
| $K_2O$ | 1 |

Hence, on a molecular equivalent basis there is as much $Li_2O$ as $K_2O$, and about as much $Na_2O$ as the sum of them.

The foregoing can also be expressed as weight percentages within the following ranges:

|  | Percent |
| --- | --- |
| $SiO_2$ | 44 to 54 |
| $B_2O_3$ | 10 to 14 |
| $Li_2O$ | 3 to 4 |
| $Na_2O$ | 13 to 16 |
| $K_2O$ | 10 to 13 |
| CaO | 4 to 6 |
| SrO | 1 to 2 |
| BaO | 2 to 3 |

If it is desired to adjust the amounts of the various ingredients of the glass frit for a particular result, these guidelines should be followed: (1) complexity of the formula is desirable; (2) the agressive monovalent fluxes ($R_2O$) are generally interchangeable but should be present in ratios to each other of not less than 1 to 4 or more than 4 to 1; and (3) other ingredients may be present in reasonable amounts, depending upon their respective characteristics known to those skilled in the art, but the total generally should not exceed 10% by weight.

It will be understood that in addition to the ingredients specified the glass frit might in some cases contain trace impurities, such as those derived from impurities in the raw materials. The amount of such impurities or of any such "other ingredients" should, of course, never be allowed to be so large as to detract from the desired properties of the glass frit.

The raw materials used in preparation of the glass frit may take the form of oxides, carbonates, nitrates, silicates, etc. For example, technical/industrial grade $SiO_2$, $H_3BO_3$, $Na_2CO_3$, $K_2CO_3$, $CaCO_3$, $SrCO_3$ and $BaCO_3$ are acceptable. Higher purity grades may also be used. For melting, high purity fused silica crucibles are recommended. The raw materials are smelted at a temperature of between 1800° F. and 1850° F. (980° C. and 1010° C.), and fritted in the conventional manner.

Industrial Applicability

Figure 2:
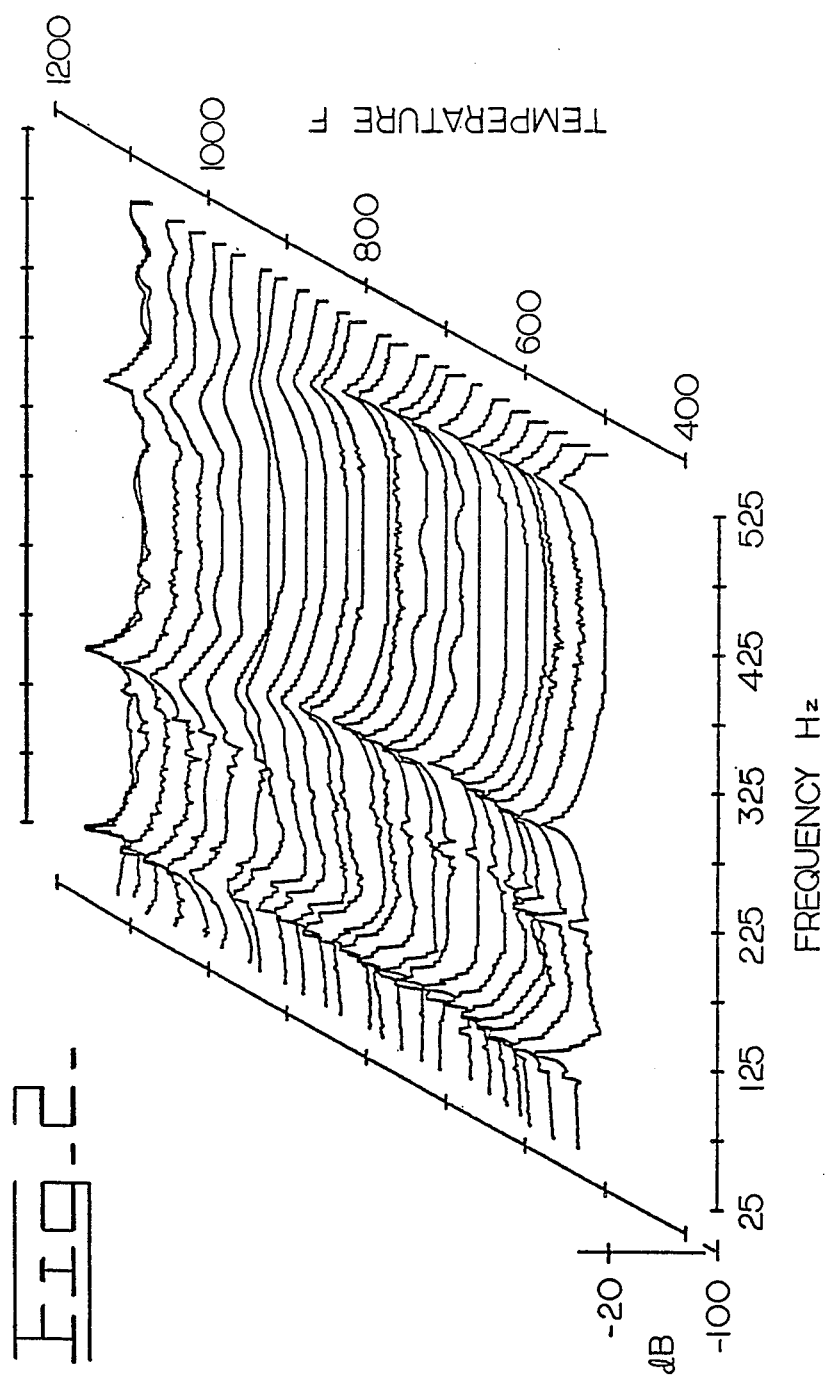
FIG. 2 is a three-dimensional graphical illustration of the damping characteristics of the glass coating in FIG. 1.

A glass frit made in accordance with this disclosure may be used to make a slip and applied to a suitable substrate in accordance with existing practices for a viscous damper or for a coating to form a matrix for holding other particulate materials. FIGS. 1 and 2 show the damping characteristics over temperature ranges from about 500° F. (255° C.) to about 1100° F. (595° C.). The drawings show a broad band of damping and suggest (at the left of FIG. 1) that there may be a second area of very effective damping.

FIG. 1 compares the loss factor of Hastelloy X, a nickel-base superalloy shown as line A, with that of a coating made for the above-disclosed glass frit shown as line B. The coating contains 17% alumina ($Al_2O_3$). The broad range of use temperature for the coating versus the narrower range for a more conventional coating shown in dashed line C is noteworthy.

FIG. 2 shows isothermal scans over a frequency range of 25 to 525 Hz of the vibrational response of Hastelloy X beams coated with compositions based on the above-described glass frit. These scans give the data shown in FIG. 1.

Strain between a coating and a substrate is generated on cooling from the firing temperature, or slightly below at a termperature where flow of the coating ceases. Therefore, close approach of coefficients of expansion and low firing temperature combine to reduce the strain on cooling to room temperature. The combination of these factors achieved using the present glass frit permits thicker coatings to be applied and permits the coating to contain large amounts of filler added for various purposes. The damping coating shown in FIG. 1 contains 17% alumina in spite of the low expansion of alumina. Additions of fillers of matching expansion, such as metallic particles with an expansion matching that of the substrate, may be made to control other properties such as electrical conductivity, modification of flow characteristics, magnetic properties, reflectivity, etc.

While the invention has been described in preferred embodiments and specific compositions, it should be understood that modifications and variations are possible in the light of the above teaching and that the invention may be otherwise practiced within the scope of the appended claims.

I claim:

1. A glass frit having a firing temperature of less than about 1100° F. and a coefficient of thermal expansion approximating that of stainless steel and many nickel-base alloys comprising about 60% by weight of glass formers, 30% by weight of monovalent fluxes and 10% by weight of divalent fluxes; the glass formers consisting essentially of $SiO_2$ and $B_2O_3$; the monovalent fluxes consisting essentially of $Li_2O$, $Na_2O$ and $K_2O$; the divalent fluxes being selected from the group consisting of $CaO$, $SrO$, and $BaO$; and additional trace elements not exceeding 10% by weight.

2. A glass frit as set forth in claim 1, wherein the amount of $SiO_2$ is about four times the amount of $B_2O_3$.

3. A glass frit as set forth in claim 1, wherein the ratio of the weights of the various monovalent fluxes to each other is not greater than 4:1.

4. A glass frit as set forth in claim 3, wherein on a molecular equivalent basis, the amount of $Na_2O$ is present in an amount about equal to the sum of the amounts of $Li_2O$ and $K_2O$.

5. A glass frit as set forth in claim 3, wherein on a molecular equivalent basis, $Li_2O$ and $K_2O$ are present in approximately like amounts.

6. A glass frit as set forth in claim 1, wherein the divalent fluxes consist essentially of $CaO$, $SrO$ and $BaO$.

7. A glass frit capable of being fired at less than 1100° F. and having the following composition, in terms of oxides:

| Oxide | Percent by weight |
| --- | --- |
| $SiO_2$ | 44 to 54 |
| $B_2O_3$ | 10 to 14 |
| $Li_2O$ | 3 to 4 |
| $Na_2O$ | 13 to 16 |
| $K_2O$ | 10 to 13 |
| $CaO$ | 4 to 6 |
| $SrO$ | 1 to 2 |
| $BaO$ | 2 to 3 | and other elements not exceeding 10% by weight.

8. A glass frit as set forth in claim 7, wherein the percent by weight is as follows:

| | |
| --- | --- |
| $SiO_2$ | 49% |
| $B_2O_3$ | 12% |
| $Li_2O$ | 3.6% |
| $Na_2O$ | 14.4% |
| $K_2O$ | 11.4% |
| $CaO$ | 5% |
| $SrO$ | 1.85% |
| $BaO$ | 2.75% |

* * * * *